United States Patent [19]

Goodridge

[11] 4,430,106

[45] Feb. 7, 1984

[54] SPINNER ROTATING APPARATUS

[75] Inventor: Paul A. Goodridge, Granville, Ohio

[73] Assignee: Owens-Corning Fiberglas Corporation, Toledo, Ohio

[21] Appl. No.: 365,703

[22] Filed: Apr. 5, 1982

[51] Int. Cl.³ .............................................. C03B 37/04
[52] U.S. Cl. ........................................ 65/15; 411/211
[58] Field of Search ............... 411/209, 210, 211, 212, 411/213; 65/14, 15, 16

[56] References Cited

U.S. PATENT DOCUMENTS

| | | | |
|---|---|---|---|
| 1,010,457 | 12/1911 | Shuter | 411/209 |
| 1,210,669 | 1/1917 | Mike et al. | 411/211 |
| 1,434,737 | 11/1922 | Enzanauer | 411/211 |
| 2,962,754 | 12/1960 | Kleist et al. | |
| 4,297,063 | 10/1981 | Hart | 411/213 X |
| 4,352,686 | 10/1982 | Crosby | 65/15 |

FOREIGN PATENT DOCUMENTS 835829  5/1960  United Kingdom ..................... 65/15

Primary Examiner—Robert L. Lindsay, Jr.
Attorney, Agent, or Firm—Ronald C. Hudgens; Philip R. Cloutier; Ted C. Gillespie

[57] ABSTRACT

Apparatus for rotating a spinner for centrifuging mineral fibers for molten mineral material comprises a quill upon which the spinner is mounted, a pin for engaging the quill and applying torque thereto, a pin carrier for holding the pin and applying rotational force thereto, a pin carrier housing for urging the pin carrier, and thus the pin, upwardly with respect to the quill, and a spindle, separate from the pin carrier housing, for rotating the pin carrier.

3 Claims, 3 Drawing Figures

SPINNER ROTATING APPARATUS

TECHNICAL FIELD

This invention pertains to the manufacture of mineral fibers from molten mineral material, such as forming glass fibers from molten glass for insulation products. In one of its more specific aspects, this invention relates to transmitting a driving force from a drive means to a rotatably mounted spinner with which mineral fibers are centrifuged from molten mineral material.

BACKGROUND OF THE INVENTION

The common practice in forming fibers of mineral material such as glass fibers, is to discharge the molten glass into a rotating centrifuge or spinner. The spinner has an orificed peripheral wall, and the molten glass passes through the orifices to produce glass fibers. The spinner is mounted for rotation on a shaft or quill, the quill is inserted into a cylindrical spindle, and the quill is held in place by a pin which engages a slot in the quill. The pin applies torque to the quill to rotate the quill and spinner. The pin is usually held in place by an annular pin carrier, which drives the pin to rotate the quill. An annular pin carrier housing surrounds the pin carrier. The pin carrier housing is threadably engageable with the spindle to be raised up upon turning of the spindle, thereby forcing the pin carrier upwardly to ensure solid contact between the pin and the quill.

Since the life of the spinner is limited, the threading of the spindle facilitates rapid insertion of the quill into the pin carrier housing during a changeover. During installation, the threading of the quill and spindle relative to the pin carrier housing causes upward movement of the pin carrier housing, thereby compressing annular wave springs and urging the pin carrier and the pin upwardly. The pin carrier and pin are urged upwardly against the top portion of the quill slot in order to prevent relative movement of the pin and the quill during operation. Without a strong upward force holding the pin at the top of the quill slot, vibration or thermal expansion could cause disengagement of the pin from the quill resulting in dropping a hot spinner onto the fiber collecting apparatus.

One of the problems associated with operating glass fiber forming equipment is that the threadable engagement of the quill and spindle does not enable a secure locking mechanism during high speed rotation of the apparatus. When rotated in one direction, the threaded insert is merely forced into a tighter threadable engagement with the threaded pin carrier housing. But when the apparatus is to be rotated in the reverse direction, the tendency is for the threaded insert to be unscrewed, thereby disengaging the quill from the pin. At times, it is desirable to operate spinners in the reverse direction. Also, at times the spinners are inadvertently operated in the reverse direction. Thus, there is a need for means enabling threadable engagement of the spindle and quill with the pin carrier housing, and at the same time provision for providing rotative force from the spindle to the pin carrier and pin via means independent of the threaded connection between the spindle with pin carrier housing.

SUMMARY OF THE INVENTION

According to this invention, there is provided apparatus for rotating a spinner for centrifuging mineral fibers from molten mineral material comprising a shaft or quill on which the spinner is mounted, a pin mounted for engaging the shaft and applying torque thereto, a pin carrier for holding the pin and applying rotational force thereto, means, such as a pin carrier housing, for urging the pin carrier, and thus the pin, axially with respect to the shaft, and means such as a spindle, separate from the means for urging, for rotating the pin carrier. By providing rotational force through means independent of the threaded connection between the spindle and the pin carrier housing, the undesirable result in the prior art, in which the spindle was subject to unthreading during operation, is avoided.

In one embodiment of the invention a pin slot is positioned in the shaft to receive the pin, the pin slot is oriented axially with respect to the shaft, and the means for urging is adapted to urge the pin against one end of the pin slot.

In a preferred embodiment of the invention the means for rotating the pin carrier comprises a cylindrical member having a slot oriented axially thereof, and the pin carrier comprises an annular member having a projection positioned on its inside diameter for engaging the slot.

In a more preferred embodiment of the invention the means for urging the pin carrier comprises a spring and means threadably engageable with the cylindrical member to compress the spring, thereby urging the pin carrier axially with respect to the shaft.

According to this invention, there is also provided apparatus for centrifuging mineral fibers from molten mineral material comprising a spinner, a shaft on the bottom of which the spinner is mounted, the shaft having a pin slot positioned at the top of the shaft, the pin slot having an end portion directed upwardly, a pin mounted in a pin carrier for engaging the pin slot and applying a torque to the shaft, the pin carrier being an annular member having a projection positioned on its inside diameter, a cylindrical spindle having a slot oriented axially thereof for receiving the projection and transmitting rotative force to the pin carrier, an annular wave spring positioned beneath the pin carrier, and a pin carrier housing threadably engageable with the spindle to compress the wave spring and urge the pin carrier upwardly, thereby urging the pin to the end portion of the pin slot, the pin carrier housing being independent of the spindle with respect to transmitting rotative force.

DESCRIPTION OF THE INVENTION

This invention will be described in terms of a glass fiber forming operation, although it is to be understood that the invention can be practiced using other heat softenable mineral materials such as rock, slag and basalt.

Figure 1:
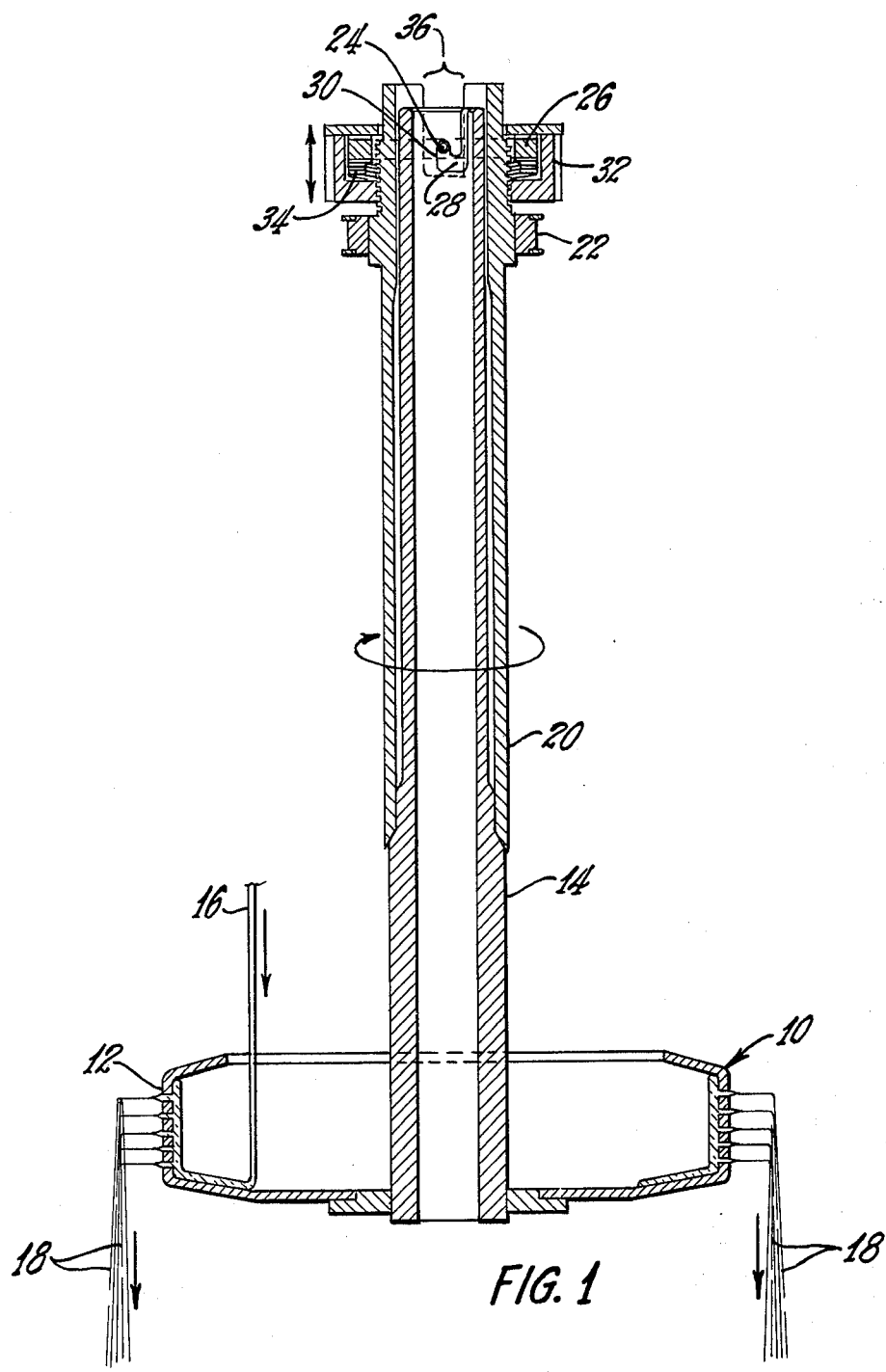
FIG. 1 is a schematic cross-section in elevation of apparatus for forming mineral fibers according to the principles of the invention.

As shown in FIG. 1, spinner 10 is adapted with orificed peripheral walls 12 and mounted on a shaft such as quill 14 for rotation. Molten glass 16 can be discharged into the spinner, where it is centrifuged into glass fibers 18. The upper end of the quill is mounted within a cylindrical member, such as spindle 20. Spindle can be adapted with pulley 22, which can be driven by a belt and an electric motor, not shown.

Pin 24 is mounted in a suitable means for mounting, such as annular pin carrier 26. Rotational force supplied to the pin carrier is transmitted to the quill by the pin. The quill can be adapted with a slot such as pin slot 28 for receiving the pin. As shown, the pin slot can have the shape of a J, having an end portion 30 oriented axially with respect to the axis of the quill and directed upwardly. Thus, when the pin is positioned in the end portion of the pin slot, the pin cannot move further upwardly with respect to the quill.

Figure 3:
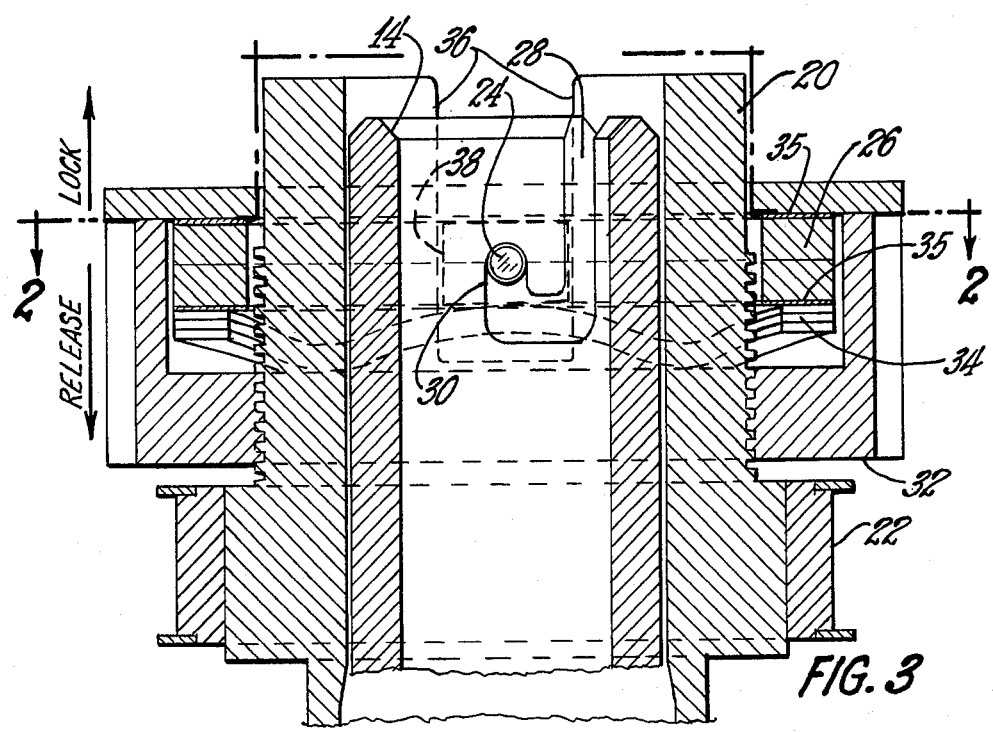
FIG. 3 is a schematic cross-section in elevation of a portion of the apparatus of FIG. 1.

As shown in FIG. 3, the pin carrier can be an annular member comprised of upper and lower halves. The pin carrier can be mounted in a means for urging the pin carrier, and thus the pin, axially with respect to the quill. Such means for urging can be pin carrier housing 32 which can be threadably engageable with the threaded portion of the spindle. Positioned within the pin carrier housing, and beneath the pin carrier can be annular wave springs 34, which are compressed when the pin carrier housing is threaded upwardly with respect to the pin carrier. Preferably, annular friction reducing washers 35 are positioned above and below the pin carrier to enable relative movement of the pin carrier with respect to the pin carrier housing during insertion.

Figure 2:
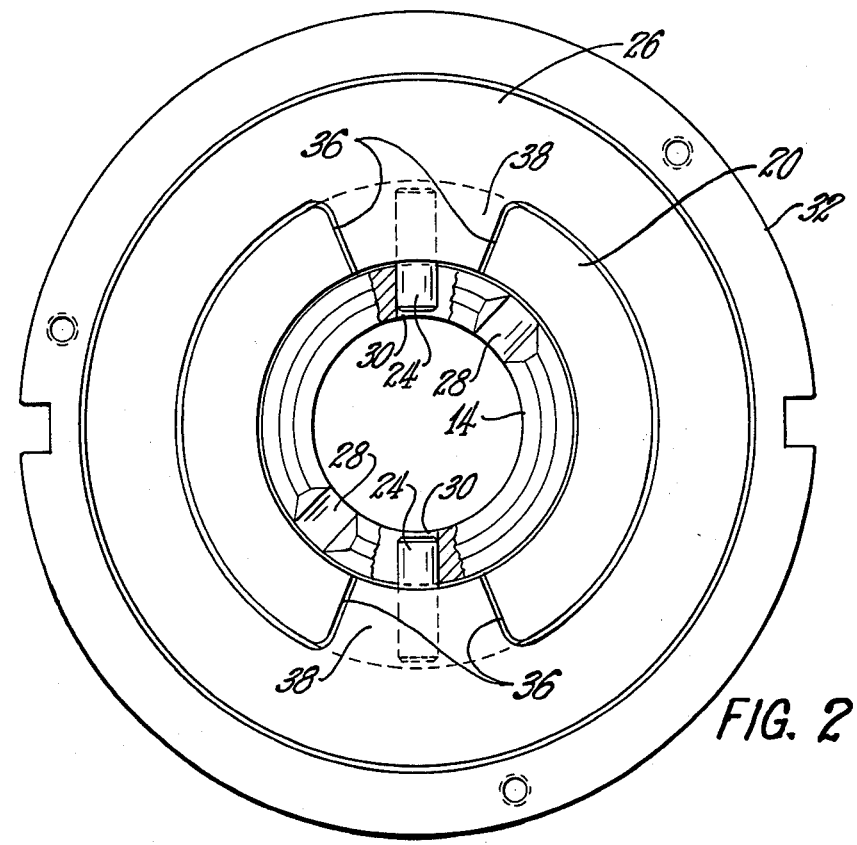
FIG. 2 is a schematic plan view of the apparatus for rotating the spinner shown in FIG. 1.

As shown in FIGS. 2 and 3, the spindle can be adapted with one or more slots 36 which can be oriented in the axial direction with respect to the spindle. The pin carrier, which is generally annularly shaped, can have one or more projections or tongues 38 which are oriented radially inwardly on the inside diameter of the annular pin carrier, and which engage the spindle slots, thereby enabling the transmission of torque from the spindle to the pin carrier. Thus, the spindle, which receives rotative force from the pulley, transmits the rotative force to the pin carrier, via the spindle slots and the pin carrier tongues. This means for transmitting rotative force is separate from or independent of the pin carrier housing which, when threadably engaged, urges the pin to the top of the slot in the quill.

During assembly, the quill is inserted into the spindle and the pin, mounted in the pin carrier, is engaged by the pin slot in the top of the quill. After engagement of the pin, the quill and spindle are rotated, thereby causing the pin carrier housing to be threaded upwardly. During assembly, the pin carrier housing can be prevented from rotating by a plunger, not shown, although the pin carrier housing must be free to move upwardly. The upward movement of the pin carrier housing during assembly of the quill and spindle causes the pin carrier and the pin to rise, thereby positioning the pin in the uppermost portion of the end portion of the J slot. Further threading of the spindle and consequent upward movement of the pin carrier housing causes compression of the wave springs, thereby forcing the pin against the end portion of the J slot with an even greater force.

After upward threading of the spindle and quill, the plunger is removed, and the pin carrier pin carrier housing, and spindle rotate as one piece. The rotative force, however, is not supplied through the pin carrier housing, but rather from the spindle directly to the pin carrier via the spindle slots and the pin carrier tongues. Thus, regardless of the direction of rotation of the spindle and quill, the driving force is not through the threaded connection, and the tendency for the spindle to unscrew from the pin carrier housing during operation is eliminated.

It will be evident from the foregoing that various modifications can be made to this invention. Such, however, are considered as being within the scope of the invention.

INDUSTRIAL APPLICABILITY

This invention will be found to be useful in the formation of fibers from molten glass for such uses as glass fiber thermal insulation products and glass fiber acoustical insulation products.

I claim:

1. Apparatus for rotating a spinner for centrifuging mineral fibers from molten mineral material comprising a shaft on which said spinner is mounted, a pin slot in said shaft having an end portion, a pin mounted for engaging said pin slot in said shaft and applying torque to said shaft, a pin carrier for holding said pin and applying rotational force thereto, means for urging said pin carrier, and thus said pin, axially with respect to said shaft, thereby forcing said pin into fixed contact with said end portion of said pin slot, and means, separate from said means for urging, for rotating said pin carrier.

2. The apparatus of claim 1 in which said means for urging said pin carrier comprises a spring and means threadably engageable with said cylindrical member to compress said spring, thereby urging said pin carrier axially with respect to said shaft.

3. Apparatus for centrifuging mineral fibers from molten mineral material comprising a spinner, a shaft on the bottom of which said spinner is mounted, said shaft having a pin slot positioned at the top of the shaft, said pin slot having an end portion directed upwardly, a pin mounted in a pin carrier for engaging said pin slot and applying a torque to said shaft, said pin carrier being an annular member having a projection positioned on its inside diameter, a cylindrical spindle having a slot oriented axially thereof for receiving said projection and transmitting rotative force to said pin carrier, an annular wave spring positioned beneath said pin carrier, and a pin carrier housing threadably engageable with said spindle to compress said wave spring and urge said pin carrier upwardly, thereby urging said pin to said end portion of said pin slot, said pin carrier housing being independent of said spindle with respect to transmitting rotative force.

* * * * *